Sept. 30, 1952
C. C. PINE
2,612,638
NAVIGATION AID SYSTEM
Filed Feb. 23, 1950
2 SHEETS—SHEET 1
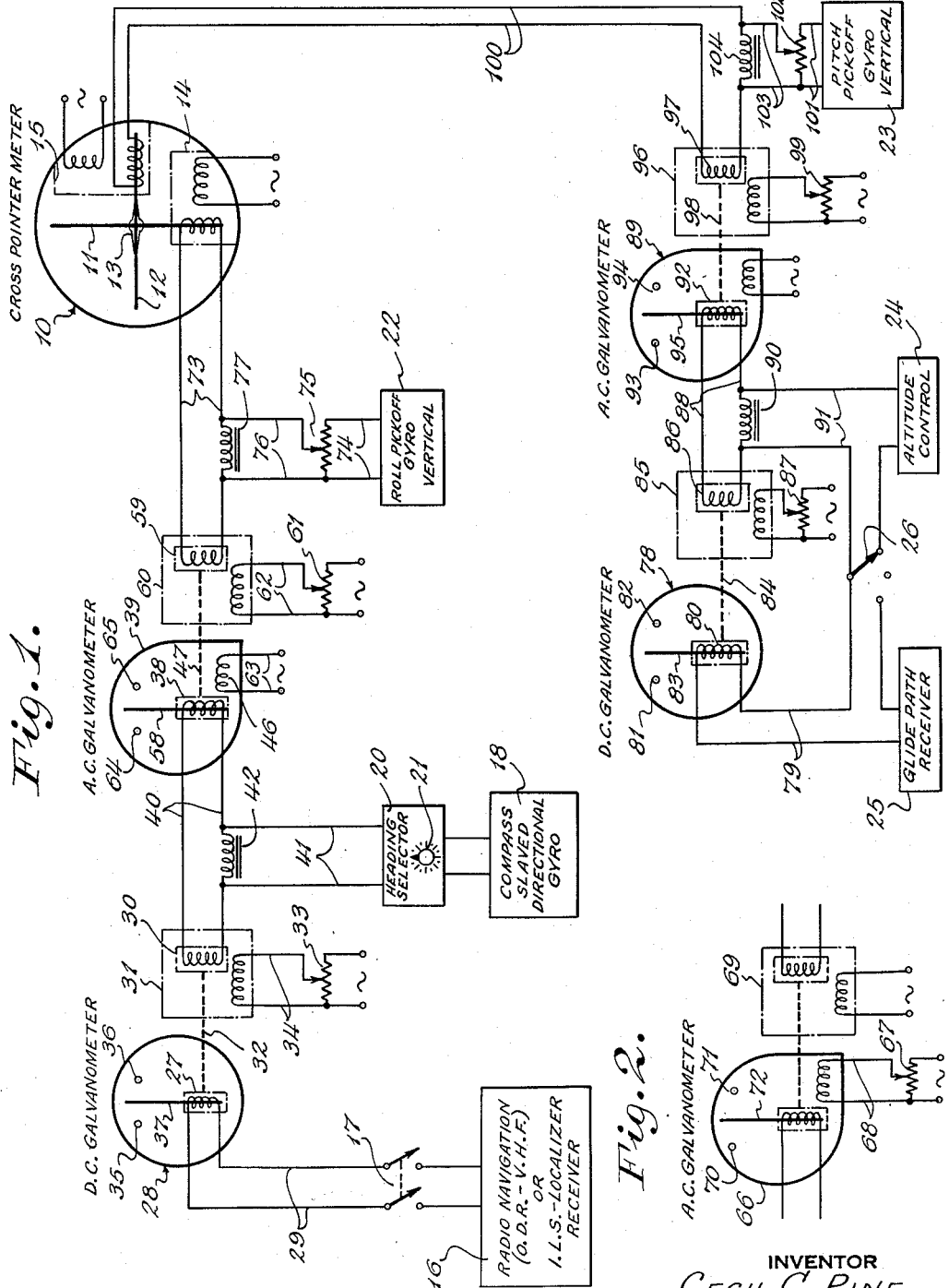
INVENTOR
CECIL C. PINE
BY Arthur H. Serrell
his ATTORNEY Sept. 30, 1952  C. C. PINE  2,612,638
NAVIGATION AID SYSTEM
Filed Feb. 23, 1950  2 SHEETS—SHEET 2

INVENTOR
CECIL C. PINE
BY Arthur H. Serrell
his ATTORNEY

Patented Sept. 30, 1952

2,612,638

UNITED STATES PATENT OFFICE 2,612,638

NAVIGATION AID SYSTEM

Cecil C. Pine, Lake Ronkonkoma, N. Y., assignor to The Sperry Corporation, a corporation of Delaware Application February 23, 1950, Serial No. 145,822

11 Claims. (Cl. 343—107)

This invention particularly relates to an electromechanical arrangement for limiting and mixing the control signals for a flight instrument such as employed in a craft navigation aid system of the character described in copending U. S. applications Serial No. 15,064, filed March 16, 1948, and Serial No. 128,227, filed November 18, 1949, by Spencer Kellogg, 2nd. Such systems are useful in assisting the pilot in manually navigating an aircraft in accordance with a chosen flight plan which may be either cross country flying at some predetermined heading or along a predetermined ground track such as may be defined by a radio beam. The flight instrument may take the form of a cross pointer meter which provides an indicator having a fixed reference with one vertical bar and one horizontal bar that are movable with respect to the reference. The operating means for the pointers may include radio signal means, heading signal means, attitude signal means and altitude signal means. This information is properly limited and combined in the system for presentation on the cross pointer meter. The pilot navigates the craft manually in roll from the vertical pointer and in pitch from the horizontal pointer to maintain the respective pointers at the reference position. By following the indications of the single flight instrument, the pilot is able to control the craft to maintain or reach a desired flight path.

Heretofore in systems of this character, a complex arrangement of electronic amplifiers, modulators and demodulators were required to combine as well as limit the respective independent control signals adapted to operate the pointers of the flight instrument. The object of the present invention is to provide a simplified computing apparatus for such a system that obviates the use of such amplifiers, modulators and demodulators. In accordance with the invention, such apparatus is provided by one or more electric signal generators mechanically coupled to respective moving coil type galvanometers in which stop means are included to limit the movement permitted the signal generator.

Figure 3:
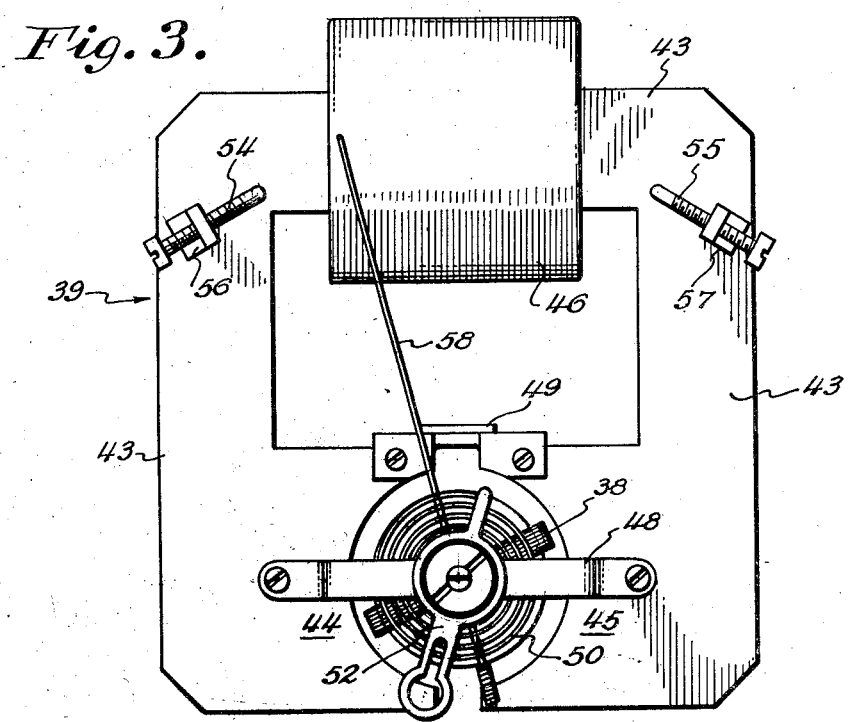
Figure 4:
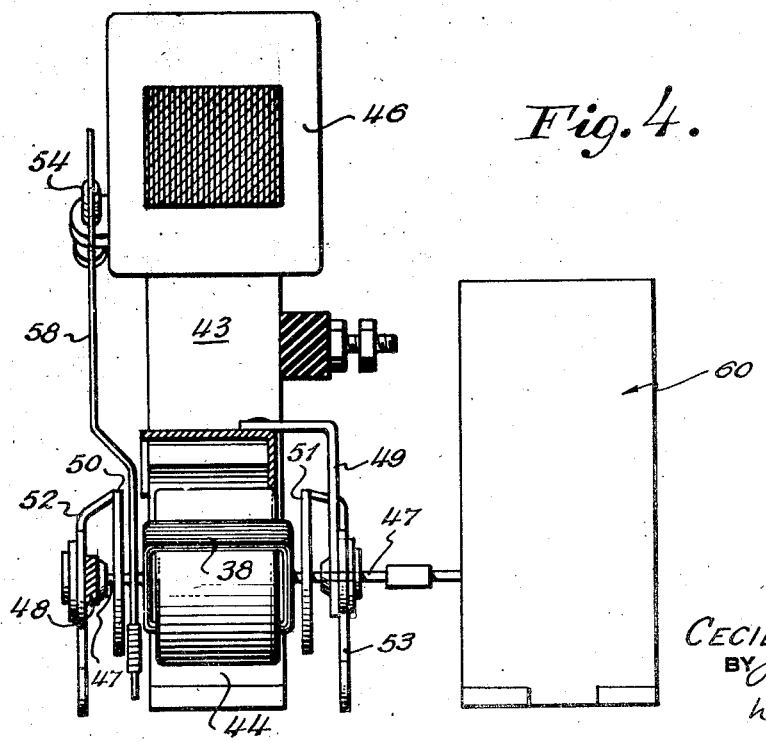

Other objects and features of the invention will become apparent from the following detailed description thereof in connection with the accompanying drawings, wherein:

Fig. 1 is a detailed wiring diagram of a craft navigation aid system in which the present inventive concepts are embodied, Fig. 2 is a wiring diagram showing a modified form of the alternating current galvanometer, Fig. 3 is an enlarged front elevation of an alternating current galvanometer employing adjustable stops, and Fig. 4 is a side elevation of the device illustrated in Fig. 3.

With reference to Fig. 1, the flight instrument of the improved craft navigation aid system is illustrated in the form of a cross pointer meter 10 which may be of the specific type shown in U. S. Design Patent No. D. 135,322. The meter 10 provides the indicator of the system and as shown includes a movable vertical pointer or bar 11 and a movable horizontal pointer or bar 12. The pointers or movable members 11 and 12 are movable relative to a fixed central reference 13 located on the background element or window of the meter 10. The meter 10 includes pointer moving means for each of the pointers as respectively indicated at 14 and 15. As generally represented in the drawing, elements 14 and 15 may be provided by suitable moving coil alternating current galvanometers. It will be understood that other types of indicators are equally adaptable to the system, such as, for example, a cathode ray tube, the beam-deflecting means of which may be controlled by signal voltages in the same manner as herein shown for the moving coils of the galvanometers 14 and 15 of the cross pointer meter 10.

In accordance with the craft navigation aid system described in the heretofore noted pending applications, pointer 11 may be moved to the right or left of the reference 13 by signal means for operating the pointer moving means 14 providing a signal having a value determined by the displacement of the craft from a prescribed ground track. This particular operating signal for the pointer moving means 14 may be a radio signal received from the I. L. S. (Instrument Landing System) Localizer beam, the Visual-oral Range or the Omni-Directional Range through a suitable radio receiver designated at 16. The selection of a desired radio signal may be made by the pilot through the operation of a suitable selector switch (not shown). When a cross country course without radio guidance is to be flown, the circuit connecting receiver 16 and meter 10 is opened by means of switch 17. A second vertical pointer operating means is provided as shown by a means providing a signal having a value determined by the deviation of the craft from a predetermined heading. Such means as herein shown may be provided by a compass slaved directional gyro 18 in which the compass is the azimuth reference and a heading selector 20 whose knob 21 is set at the heading desired for the craft by the pilot. The vertical pointer 11 of the meter may also be controlled by a third operating means in accordance with a roll signal from the roll pick-off of a gyro vertical as designated at 22.

The horizontal bar 12 of the indicating meter 10 may be controlled in accordance with the described craft navigation aid system by an operating means providing a signal from the pitch pick-off of the gyro vertical as indicated at 23. An altitude control means as designated at 24 provides an additional control signal for the pointer 12 having a value determined by the departure of the craft from a predetermined altitude. A further operating means for the meter may be provided by an I. L. S. (Instrument Landing System) glide path radio receiver as indicated at 25. The selection of either receiver 25 or altitude control 26 in the system is made by the pilot in setting a switch 26 in accordance with the desired flight plan. As shown in Fig. 1, switch 17 is open and switch 26 is closed to the altitude control position so that the respective radio receivers 16 and 25 do not provide input signals for the meter 10. With this setting of the switches 17 and 26, the system is set for cross country flight without radio guidance.

The equipment which supplies the above described flight information may be of conventional form. For example, the gyro vertical providing a roll and pitch reference for the craft may be of the type generally employed in automatic pilots where the roll and pitch pick-offs thereof provide displacement signals upon departure of the craft from a reference position about its roll and pitch axes. The device for providing a heading signal may be a compass slaved directional gyro of the type shown in U. S. Patent No. 2,357,319. As described in this patent, the compass slaved directional gyro includes a directional gyro whose spin axis is stabilized in a horizontal plane by a leveling device and whose orientation in azimuth is slaved to the earth's magnetic meridian by a field-sensitive device such as a flux valve. The heading selector 20 may be of the type disclosed in U. S. Patent No. 2,415,430, the selector and the element 18 providing a signal proportional to the displacement of the craft in azimuth from a predetermined heading. The altitude control 24 may be of the type disclosed in detail in U. S. Patent No. 2,446,546 wherein a pneumatic bellows positions an element of an electric signal generator, such as an "E" pick-off as designated at 62 in the noted patent, for providing a signal proportional to deviation of the craft from a selected altitude. The radio receivers 16 and 25 of the system are of conventional construction.

The meter 10 furnishes to the pilot a visual indication of the amount and direction of correction required in flight attitude in order to control the craft with respect to a selected flight plan. When the flight attitude of the aircraft for the selected plan is correct, the two pointers 11 and 12 are centered with respect to the reference 13 of the meter. Departures from correct flight for the selected plan are indicated by displacement of either or both of the pointers from the centered position, the magnitude of such displacement being shown, at any given instant, by the displacement of the pointers from the reference position. Restoration of the pointers to the centered position by manual control of the craft by the pilot in roll for pointer 11 and in pitch 12, indicates to the pilot that the craft has been caused to assume the correct attitude relative to the selected flight plan. That is, if the aircraft is displaced from a predetermined course but the aircraft attitude has been adjusted as to center the vertical pointer, the aircraft will approach and thereafter maintain the course as long as the bar is centered. The operation is similar for the horizontal pointer if the craft is initially displaced from either the radio glide path or a selected altitude.

In accordance with my craft navigation aid system, the deflection of the pointer 11 is primarily controlled, when switch 17 is closed, by a signal proportional to displacement of the craft from the chosen radio path minus a signal proportional to the heading error of the craft, as compared to the original heading set by the heading selector and minus a signal proportional to the banking angle of the craft, assuming the craft to be obeying the primary signal. In case the craft is on a cross country flight and not using radio aid, the signal generated when the craft departs from the course set by the heading selector 20 becomes the displacement term from which is subtracted the rate of turn term as measured by the bank angle. Similarly, the pitch pointer 12 is controlled from like combinations of the signals from the glide path receiver 25 (or altitude controller 24) and the pitch error signal from the gyro vertical 23.

To prevent the craft from assuming a dangerous pitch or bank attitude during operation of the system with the craft moving in pitch and roll to maintain the pointers 11 and 12 in a centralized position on the meter, it is necessary to limit the control signals to predetermined ratios and values such that, for example, the maximum radio signal will be equalled by a signal proportional to a 60° heading error and such that the combined radio and heading signals will be equalled by a signal from the roll pick-off corresponding to a banking angle of 20°. The signal of the pitch pick-off corresponding to a 6° pitch angle may be arranged to cancel a full scale radio signal from the glide path receiver. Further, the control signals for pointer 12 may be combined so that plus or minus one degree change in pitch attitude should cancel an approximate 20 ft. error in altitude. The noted values are exemplary and may be varied to suit particular types of aircraft.

In accordance with the present invention, the direct current control signal from the radio receiver 16 of the system may be coupled to the moving coil element 27 of a direct current galvanometer 28 through switch 17 by way of leads 29, as shown in Fig. 1. The moving element of the galvanometer is biased by suitable centering means in the form of springs such as illustrated in the alternating current form of galvanometer shown in Figs. 3 and 4. The rotor 30 of an electrical signal generator 31 is driven by element 27 of the galvanometer 28 by a mechanical connecting means in the form of a shaft 32. The stator of the generator 31 is energized from a suitable source of alternating current electrical energy by way of potentiometer 33 and leads 34. Stop means are also provided for limiting the movement permitted the shaft 32 to thereby maintain the amplitude of the signal from receiver 16 on the indicator 10 within predetermined limits. In the form of the invention shown in Fig. 1, the provided stop means includes a pair of fixed mechanical stops 35 and 36 attached to the body of the direct current galvanometer which cooperate with a limit piece 37 connected to shaft 32 of the moving coil element 27. The direction of movement of the element 27 depends on the polarity of the input signal thereto. The amplitude of the corresponding alternating current output from generator 31 due to motion of the shaft from its normal null position may be adjusted to a desired value by means of the potentiometer 33.

In accordance with the invention, as shown in Fig. 1, the signal from generator 31 is fed to the moving coil element 38 of an alternating current galvanometer 39 by way of leads 40. Coil element 38 is also coupled to the selector 20 of the system by way of leads 41 and autotransformer 42, the circuit combining the control signals of the gyro 19 and receiver 16. When switch 17 is open, the only input to galvanometer 39 is provided by the gyro 18 which with selector 20 provides a signal having a value determined by the deviation of the craft from a predetermined heading. The indicator operating means provided by receiver 16 provides a signal having a value determined by the displacement of the craft from a prescribed ground track.

As particularly shown in Figs. 3 and 4, the alternating current galvanometer includes a body in the form of a magnetic core 43 having pole pieces 44, 45 and an exciting winding 46. The coil element 38 of the galvanometer is situated between the pole pieces 44, 45 and is fixed to shaft 47 pivotally mounted on brackets 48, 49 suitably secured to the core 43. Adjustable spiral centering springs 50, 51 for the moving coil element respectively connect the shaft 47 with settable arm 52, and settable arm 53. The stop means is herein shown in the form of a pair of adjustable mechanical stops 54 and 55 situated on screw threaded bosses 56, 57 on the core 43. The part cooperating with the stops 54, 55 is herein shown in the form of arm 58 fixed to shaft 47. The direct current galvanometer 28 hereinbefore described is similar to galvanometer 39 with the exception that the exciting coil 46 is omitted and core 43 is provided by a permanent magnet.

As shown in Fig. 1, the shaft 47 of galvanometer 39 connects with the rotor 59 of a second electrical signal generator 60 which may be similar to generator 31. The stator of generator 31 may be excited from a suitable source of alternating current electrical energy by way of potentiometer 61 and leads 62. The exciting winding 46 of the galvanometer 39 is excited from a suitable source of alternating current electrical energy by way of leads 63. The generators 31 and 60 are shown schematically herein as alternating current self-synchronous transmitters of the Selsyn type having wound rotors. Other equivalent electrical types of generators may obviously be used in the improved system without departing from the invention.

The galvanometer 39 shown in Fig. 1 employs a pair of fixed stops 64, 65 in cooperation with limit arm 58 instead of the adjustable stops provided in the form of galvanometer shown in Figs. 3 and 4. Where the excitation of the stator windings of the generators of the system are adjustable as by a potentiometer, the stops may be fixed. An alternative arrangement, that permits the use of fixed stops is shown in Fig. 2. In this arrangement, the galvanometer 66 is excited from a suitable source of alternating current electrical energy by way of potentiometer 67 and leads 68. The stator of the generator 69 coupled to the galvanometer 66 is shown as constantly excited from a suitable alternating current source of electrical energy. The stops 70, 71 for the limit arm 72 of the galvanometer are fixedly mounted. The form of galvanometer shown in Figs. 3 and 4 employing adjustable mechanical stops 54 and 55 consequently provides a third modification of the invention in which the system does not include settable adjustments for varying the excitation of either the exciting coil of the alternating current galvanometer or the stators of the electrical generators employed.

The position of the rotor 59 (Fig. 1) as determined by galvanometer 39 by way of shaft 47 controls the output of the generator 60 so that the same provides a single signal for the moving means 14 for pointer 11 that depends on the combined signals of receiver 16 and gyro 18 or depends on the individual signal of the gyro 18. This signal is fed to moving means 14 by way of leads 73. The normal balancing signal employed in the flying system for the signal of generator 60 is provided by the output of an alternating current pick-off at the roll axis of a gyro vertical as indicated at 22 by the legend roll pick-off gyro vertical. The signal of the roll pick-off may be fed to the moving means 14, as shown, by way of leads 74, potentiometer 75, leads 76 and autotransformer 77 to the input leads 73. The amplitude of the controlling signal from the roll pick-off of the gyro vertical may be adjusted as desired by the potentiometer 75.

As shown in Fig. 1, a similar arrangement is provided for mixing and limiting the control signals of the glide path receiver 25 or altitude control 24 with the signal of a pick-off about the pitch axis of the vertical as designated at 23 in conjunction with the moving means 15 for regulating the operation of pointer 12 of the indicator 10. In this connection, receiver 25 is connected to direct current galvanometer 78 through switch 26 by way of leads 79. The moving coil of galvanometer 78 is indicated at 80 and the fixed stops are indicated at 81 and 82. The limit piece 83 of the galvanometer 78 is connected to shaft 84 and the moving coil element 89. The electrical generator of the system, corresponding to generator 31, is designated at 85. As shown, the rotor 86 of generator 85 is connected to shaft 84. The stator of the generator 85 is excited by a suitable source of alternating current electrical energy by way of potentiometer 87. In this arrangement, the output of generator 85 is fed by way of leads 88 to an alternating current galvanometer 89 corresponding to galvanometer 39. Altitude control 24 provides a signal having a value determined by the extent of the departure of the craft from a predetermined altitude. The altitude control signal is fed to alternating current galvanometer 89 by way of leads 88, autotransformer 90 and leads 91 through switch 26. The coil element of the galvanometer 89 is designated at 92. As shown, galvanometer 89 includes fixed stops 93, 94 and limit piece 95 on the moving coil element 92. Generator 96 corresponds to the heretofore described generators 31 and 60, the rotor 97 thereof being connected to the element 92 by way of shaft 98. Potentiometer 99 regulates the excitation of the stator of generator 96 as desired. The output of generator 96 is fed by way of leads 100 to the moving means 15 for the pointer 12 of indicator 10. In this instance, the output of generator 96 is normally balanced by the input to the system provided from the pick-off at the pitch axis of the gyro vertical. As shown, this signal is fed to the pointer moving means 15 from the pitch pick-off gyro vertical 23 by way of leads 101, potentiometer 102, leads 103, and autotransformer 104 to leads 100. The adjustment of the pitch signal in the system is controlled by the potentiometer 102. The described control elements 16, 18, 24 and 25 are capable of providing operating signals for the respective pointer moving means of too large an amplitude for proper use in the signal mixing system.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a signal mixing system having an indicator with a movable pointer, pointer moving means, and means capable of providing an operating signal for said pointer moving means of too large an amplitude for proper use in the mixing system; a galvanometer having a moving coil element coupled to the operating signal means, an electrical signal generator coupled to the pointer moving means having a rotor, means mechanically connecting said coil element and rotor, and stop means for said mechanical connecting means to limit the movement thereof and thereby properly limit the amplitude of the signal operating means in the mixing system.

2. A system as claimed in claim 1, in which said stop means includes a pair of adjustable mechanical stops on said galvanometer.

3. A system as claimed in claim 1, in which said galvanometer includes an exciting coil, said stop means includes a pair of fixed mechanical stops on said galvanometer, and means for adjusting the excitation of said exciting coil.

4. A system as claimed in claim 1, in which said signal generator includes an exciting winding, said stop means includes a pair of fixed mechanical stops on said galvanometer, and means for adjusting the excitation of said exciting winding.

5. In a signal mixing system having an indicator with a movable pointer, pointer moving means, and means capable of providing an operating signal for said pointer moving means of too large an amplitude for proper use in the mixing system; a galvanometer having a moving coil element coupled to the operating signal means including means for limiting the travel of said element to maintain the amplitude of the signal operating means in the mixing system within proper limits, and an alternating current self-synchronous transmitter coupled to said pointer moving means having a rotor driven by said moving coil element.

6. In a signal mixing system having an indicator with a movable pointer, pointer moving means, and means capable of providing an operating signal for said pointer moving means of too large an amplitude for proper use in the mixing system; a direct current galvanometer having a moving coil element coupled to the operating signal means, an alternating current self-synchronous transmitter coupled to said pointer moving means having a rotor driven by said moving coil element, and means for limiting the movement of said rotor to maintain the amplitude of the signal operating means within proper limits in the mixing system.

7. In a signal mixing system having an indicator with a movable pointer, pointer moving means, and means capable of providing an operating signal for said pointer moving means of too large an amplitude for proper use in the mixing system; an alternating current galvanometer having a moving coil element coupled to the operating signal means, an alternating current self-synchronous transmitter coupled to said pointer moving means having a rotor driven by said moving coil element, and means for limiting the movement of said coil element to maintain the amplitude of the signal operating means within proper limits in the mixing system.

8. In a signal mixing system having an indicator with a movable pointer, pointer moving means, first means capable of providing an operating signal for said pointer moving means of too large an amplitude for proper use in the mixing system, and second means capable of providing an operating signal for said pointer moving means of too large an amplitude for proper use in the mixing system; a first galvanometer having a moving coil element coupled to the first operating signal means, an electrical signal generator having a rotor driven by said moving coil element, means for limiting the movement of said coil element to maintain the amplitude of the first signal operating means in the mixing system within proper limits, a second galvanometer having a moving coil element coupled to the second of said operating signal means and to said signal generator, a second electrical signal generator coupled to said pointer moving means having a rotor driven by the moving coil element of said second galvanometer, and means for limiting the movement of said second coil element to maintain the amplitude of the combined signals of the first and second signal operating means within proper limits in the mixing system.

9. In a craft navigation aid system having an indicator with a movable member, member moving means, and means for operating said member moving means providing a signal having a value determined by the displacement of the craft from a prescribed ground track; a galvanometer having a moving coil element coupled to said operating signal means, an electrical signal generator coupled to the member moving means having a rotor moved by said coil element, and means for limiting the movement of said coil element to maintain the amplitude of the signal from said generator within proper limits in the system.

10. In a craft navigation aid system having an indicator with a movable member, member moving means, and means for operating said member moving means providing a signal having a value determined by the deviation of the craft from a predetermined heading; a galvanometer having a moving coil element coupled to said operating signal means, an electrical signal generator coupled to the member moving means having a rotor moved by said coil element, and means for limiting the movement of said coil element to maintain the amplitude of the signal from said generator within proper limits in the system.

11. In a craft navigation aid system having an indicator with a movable member, member moving means, and means for operating said member moving means providing a signal having a value determined by the extent of the departure of the craft from a predetermined altitude; a galvanometer having a moving coil element coupled to said operating signal means, an electrical signal generator coupled to the member moving means having a rotor moved by said coil element, and means for limiting the movement of said generator to maintain the amplitude of its signal within proper limits in the system.

CECIL C. PINE.

REFERENCES CITED

The following references are of record in the file of this patent:

UNITED STATES PATENTS

| Number | Name | Date |
|---|---|---|
| Re. 20,282 | Bernarde | Mar. 9, 1937 |
| 2,368,701 | Borden | Feb. 6, 1945 |
| 2,502,721 | Halpert | Apr. 4, 1950 |

FOREIGN PATENTS

| Number | Country | Date |
|---|---|---|
| 476,132 | Germany | May 24, 1929 |
| 516,567 | Great Britain | Jan. 5, 1940 |